(12) United States Patent
Motoike et al.

(10) Patent No.: US 8,047,315 B2
(45) Date of Patent: Nov. 1, 2011

(54) DRIVING DEVICE, MOTOR VEHICLE EQUIPPED WITH DRIVING DEVICE, AND CONTROL METHODS OF DRIVING DEVICE AND MOTOR VEHICLE

(75) Inventors: Kazutoshi Motoike, Okazaki (JP); Masatoshi Adachi, Aichi-ken (JP); Yumi Iraha, Toyota (JP); Jun Ichiyanagi, Anjo (JP); Satoru Wakuta, Anjo (JP); Kenji Omote, Anjo (JP); Masanori Onoda, Anjo (JP)

(73) Assignees: Toyota Jidosha Kabushiki Kaisha, Toyota-shi (JP); Aisin AW Co., Ltd., Anjo-shi (JP)

( * ) Notice: Subject to any disclaimer, the term of this patent is extended or adjusted under 35 U.S.C. 154(b) by 1104 days.

(21) Appl. No.: 11/884,928

(22) PCT Filed: Mar. 31, 2006

(86) PCT No.: PCT/JP2006/307419
§ 371 (c)(1),
(2), (4) Date: Aug. 23, 2007

(87) PCT Pub. No.: WO2006/115009
PCT Pub. Date: Nov. 2, 2006

(65) Prior Publication Data
US 2008/0135314 A1  Jun. 12, 2008

(30) Foreign Application Priority Data
Apr. 4, 2005 (JP) ................................. 2005-107425

(51) Int. Cl.
*B60W 10/00* (2006.01)
*B60W 10/04* (2006.01)

(52) U.S. Cl. .......... 180/65.285; 180/65.275; 180/65.265
(58) Field of Classification Search ................. 180/65.1, 180/65.21, 65.265, 65.275, 65.285; 192/113.1, 192/113.3; 475/161
See application file for complete search history.

(56) References Cited

U.S. PATENT DOCUMENTS

| | | | |
|---|---|---|---|
| 4,079,275 A * | 3/1978 | Fu ................................... | 310/57 |
| 5,217,085 A * | 6/1993 | Barrie et al. ............... | 184/104.1 |
| 5,895,590 A * | 4/1999 | Suzuki ........................ | 219/205 |
| 5,927,073 A * | 7/1999 | Ishizaki et al. .................. | 60/487 |
| 6,114,784 A * | 9/2000 | Nakano .......................... | 310/59 |
| 6,752,225 B2 * | 6/2004 | Kojima ...................... | 180/65.25 |
| 6,864,604 B2 * | 3/2005 | Nakano et al. .................. | 310/57 |
| 6,903,471 B2 * | 6/2005 | Arimitsu et al. ................ | 310/59 |
| 2007/0056826 A1 * | 3/2007 | Burns et al. ................ | 192/70.12 |

FOREIGN PATENT DOCUMENTS

DE  103 05 513 A1  8/2004

(Continued)

*Primary Examiner* — Hau Phan
*Assistant Examiner* — Travis Coolman
(74) *Attorney, Agent, or Firm* — Kenyon & Kenyon LLP

(57) ABSTRACT

In setting of an oil temperature increasing process mode, the drive control technique of the invention starts an engine to actuate a mechanical oil pump that pressure feeds a flow of lubricating oil for lubricating the mechanical parts of a transmission and other relevant parts, actuates an electric oil pump that pressure feeds the flow of lubricating oil, and makes a brake B1 included in the transmission in a semi-engagement state. A motor arranged adjacent to the transmission is then driven with lowered output efficiency. This arrangement effectively accelerates heat generation by the motor and ensures a quick temperature rise of the lubricating oil.

11 Claims, 6 Drawing Sheets

FOREIGN PATENT DOCUMENTS

| | | |
|---|---|---|
| EP | 1 495 901 A | 1/2005 |
| JP | 2000-120848 | 4/2000 |
| JP | 2002-174328 | 6/2002 |
| JP | 2002-225578 | 8/2002 |
| JP | 2004-72945 A | 3/2004 |
| JP | 2004-248402 A | 9/2004 |
| JP | 2004-353782 | 12/2004 |
| WO | WO 02/40845 A2 | 5/2002 |

* cited by examiner

DRIVING DEVICE, MOTOR VEHICLE EQUIPPED WITH DRIVING DEVICE, AND CONTROL METHODS OF DRIVING DEVICE AND MOTOR VEHICLE

This is a 371 national phase application of PCT/JP2006/307419 filed 31 Mar. 2006, which claims priority to Japanese Patent Application No. 2005-107425, filed 04 Apr. 2005, the contents of which are incorporated herein by reference.

1. Technical Field

The present invention relates to a driving device, a motor vehicle equipped with the driving device, and control methods of the driving device and the motor vehicle.

2. Background Art

One proposed driving device uses a first motor generator and a power distribution planetary gear mechanism to output power of an engine to a driveshaft, while converting power of a second motor generator by gear change of a transmission and transmitting the converted power to the driveshaft (see, for example, Japanese Patent Laid-Open Gazette No. 2002-225578)

In a driving device with a transmission, a lubricating medium (lubricating oil) is generally used to lubricate a power transmission mechanism, for example, a gear mechanism, of the transmission. For the purpose of maintenance of a motor vehicle equipped with such a driving device, a certain amount of lubricating oil may be injected into the motor vehicle. The volume and the viscosity of the lubricating oil is affected by a temperature variation. It is accordingly desirable to raise the temperature of the lubricating oil to a preset temperature range prior to the injection. A quick temperature rise of the lubricating oil to the preset temperature range is demanded for the better working ability. Heat exchange means is thus required to enable a quick temperature rise of the lubricating oil through heat exchange with the lubricating oil in the transmission. In conventional gasoline engine vehicles that convert the power of an engine by gear change in a transmission and output the converted power to a driveshaft, the heat of the engine and the heat generated by rotation of a torque converter attached to an output shaft of the engine are utilized to increase the temperature of the lubricating oil. In the conventional gasoline engine vehicles, the operation of the engine is also used to circulate the flow of lubricating oil and accelerate the temperature rise of the lubricating oil.

DISCLOSURE OF THE INVENTION

In motor vehicles without an engine, for example, electric vehicles equipped with a transmission, the heat of the engine and the heat generated by the rotation of the toque converter are unusable for the temperature rise of the lubricating oil. In hybrid vehicles that use a first motor generator and a planetary gear mechanism to output the power of an engine to a driveshaft while outputting the power of a second motor generator to the driveshaft via a transmission, the engine generally stops during a vehicle stop. The engine is thus unusable to circulate the flow of lubricating oil and to accelerate the temperature rise of the lubricating oil.

The technique of the invention is applicable to a driving device including a transmission, a motor vehicle equipped with such a driving device, and control methods of the driving device and the motor vehicle to quickly increase the temperature of a lubricating medium, which is used for lubrication of the transmission, to a preset temperature range.

In order to attain at least part of the above and the other related objects, the driving device of the invention, the motor vehicle equipped with the driving device, and the control methods of the driving device and the motor vehicle have the configurations discussed below.

The present invention is directed to a driving device that is equipped with a motor having power input and output capabilities, and the driving device includes: a gear change transmission assembly that has a power transmission mechanism and converts the output power of the motor by gear change and transmits the converted power to a driveshaft; a lubrication structure that stores and uses a lubricating medium to lubricate at least the power transmission mechanism of the gear change transmission assembly and is arranged to enable heat exchange between at least part of the lubricating medium with the motor; and an upon-request control module that drives and controls the motor upon a certain request to enhance the heat exchange between the lubricating medium and the motor and thereby accelerate a temperature rise of the lubricating medium.

The first driving device of the invention drives and controls the motor upon a certain request to enhance the heat exchange between the lubricating medium and the motor and thereby accelerate the temperature rise of the lubricating medium. The 'certain request' may be the operator's specific operation for setting a maintenance mode. Such drive control of the motor may be performed in the process of injecting a certain amount of a lubricating medium into the driving device for the purpose of maintenance of the driving device. This arrangement of the first driving device enhances the heat exchange with the motor, which is driven to generate heat, and thereby ensures a quick temperature rise of the lubricating medium.

In one preferable embodiment of the invention, the first driving device further includes an accumulator unit that transmits electric power to and from the motor. The upon-request control module drives and controls the motor within an output limit of the accumulator unit. This arrangement effectively prevents over discharge of the accumulator unit.

In the first driving device of the invention, the upon-request control module may drive and control the motor to accelerate heat generation by the motor. This ensures a quick temperature rise of the lubricating medium.

In another preferable embodiment of the invention, the first driving device further includes a locking mechanism that locks the driveshaft in a non-rotatable state. The upon-request control module controls the motor and the locking mechanism to heat up the lubricating medium through the heat exchange with the motor in the locked driveshaft in the non-rotatable state. This arrangement desirably prevents unexpected power output from the driveshaft by the operation of the motor.

In one preferable structure of the first driving device of the invention, the gear change transmission assembly has a movable section that moves with rotation of the motor and an engagement section that applies a friction-based engagement force to the movable section. The upon-request control module controls the motor and the gear change transmission assembly to drive the motor and make the engagement section of the gear change transmission assembly in a semi-engagement state. The heat generation caused by the semi-engagement of the engagement section of the gear change transmission assembly is utilized to attain a quicker temperature rise of the lubricating medium. Compared with a non-engagement state of the engagement section of the gear change transmission assembly, the semi-engagement state of the engagement section enables application of a reactive force to the motor. This further accelerates heat generation by the motor and ensures a quicker temperature rise of the lubricating medium.

The present invention is directed to a second driving device that is used in combination with an internal combustion engine and is equipped with a motor having power input and output capabilities. The second driving device includes: a gear change transmission assembly that has a power transmission mechanism and converts the output power of the motor by gear change and transmits the converted power to a driveshaft; a lubrication structure that stores and uses a lubricating medium to lubricate at least the power transmission mechanism of the gear change transmission assembly, is arranged to enable heat exchange between at least part of the lubricating medium with the motor, and receives output power of the internal combustion engine to circulate the lubricating medium; and an upon-request control module that, upon a certain request, drives and controls the motor to enhance the heat exchange between the lubricating medium and the motor and thereby accelerate a temperature rise of the lubricating medium, while starting the internal combustion engine to circulate the lubricating medium.

Upon a certain request, the second driving device of the invention drives and controls the motor to enhance the heat exchange between the lubricating medium and the motor and thereby accelerate the temperature rise of the lubricating medium, while starting the internal combustion engine as the power source to circulate the lubricating medium. The 'certain request' may be the operator's specific operation for setting a maintenance mode. Such drive control of the motor may be performed in the process of injecting a certain amount of a lubricating medium into the driving device for the purpose of maintenance of the driving device. This arrangement of the second driving device enhances the heat exchange with the motor, which is driven to generate heat, and thereby ensures a quick temperature rise of the lubricating medium, while utilizing the output power of the internal combustion engine to circulate the lubricating medium. The circulation of the lubricating medium enables an efficient and even temperature rise of the lubricating medium.

The second driving device may further include a locking mechanism that locks the driveshaft in a non-rotatable state. In the second driving device, the upon-request control module may control the motor and the locking mechanism to heat up the lubricating medium through the heat exchange with the motor in the locked driveshaft in the non-rotatable state. This arrangement desirably prevents unexpected power output from the driveshaft by the operation of the motor.

In one preferable structure of the second driving device of the invention, the gear change transmission assembly has a movable section that moves with rotation of the motor and an engagement section that applies a friction-based engagement force to the movable section. The upon-request control module controls the motor and the gear change transmission assembly to drive the motor and make the engagement section of the gear change transmission assembly in a semi-engagement state. The heat generation caused by the semi-engagement of the engagement section of the gear change transmission assembly is utilized to attain a quicker temperature rise of the lubricating medium. Compared with a non-engagement state of the engagement section of the gear change transmission assembly, the semi-engagement state of the engagement section enables application of a reactive force to the motor. This further accelerates heat generation by the motor and ensures a quicker temperature rise of the lubricating medium.

The second driving device may further include: an electric power-mechanical power input output mechanism that is connected to an output shaft of the internal combustion engine and to the driveshaft and outputs at least part of the output power of the internal combustion engine to the driveshaft through input and output of electric power and mechanical power; and an accumulator unit that transmits electric powers to and from the electric power-mechanical power input output mechanism and the motor. In the second driving device, the upon-request control module may drive the electric power-mechanical power input output mechanism and the motor within an output limit of the accumulator unit.

The present invention is directed to a first motor vehicle including: a motor that is capable of inputting and outputting power; a gear change transmission assembly that has a power transmission mechanism and converts the output power of the motor by gear change and transmits the converted power to an axle; a lubrication structure that stores and uses a lubricating medium to lubricate at least the power transmission mechanism of the gear change transmission assembly and is arranged to enable heat exchange between at least part of the lubricating medium with the motor; and an upon-request control module that drives and controls the motor upon a certain request to enhance the heat exchange between the lubricating medium and the motor and thereby accelerate a temperature rise of the lubricating medium.

The first motor vehicle of the invention drives and controls the motor upon a certain request to enhance the heat exchange between the lubricating medium and the motor and thereby accelerate the temperature rise of the lubricating medium. The 'certain request' may be the operator's specific operation for setting a maintenance mode. Such drive control of the motor may be performed in the process of injecting a certain amount of a lubricating medium into the driving device for the purpose of maintenance of the driving device. This arrangement of the first driving device enhances the heat exchange with the motor, which is driven to generate heat, and thereby ensures a quick temperature rise of the lubricating medium.

The present invention is also directed to a second motor vehicle including: an internal combustion engine; a motor that is capable of inputting and outputting power; a gear change transmission assembly that has a power transmission mechanism and converts the output power of the motor by gear change and transmits the converted power to a driveshaft; a lubrication structure that stores and uses a lubricating medium to lubricate at least the power transmission mechanism of the gear change transmission assembly, is arranged to enable heat exchange between at least part of the lubricating medium with the motor, and receives output power of the internal combustion engine to circulate the lubricating medium; and an upon-request control module that, upon a certain request, drives and controls the motor to enhance the heat exchange between the lubricating medium and the motor and thereby accelerate a temperature rise of the lubricating medium, while starting the internal combustion engine to circulate the lubricating medium.

Upon a certain request, the second motor vehicle of the invention drives and controls the motor to enhance the heat exchange between the lubricating medium and the motor and thereby accelerate the temperature rise of the lubricating medium, while starting the internal combustion engine as the power source to circulate the lubricating medium. The 'certain request' may be the operator's specific operation for setting a maintenance mode. Such drive control of the motor may be performed in the process of injecting a certain amount of a lubricating medium into the driving device for the purpose of maintenance of the driving device. This arrangement of the second vehicle motor enhances the heat exchange with the motor, which is driven to generate heat, and thereby ensures a quick temperature rise of the lubricating medium, while utilizing the output power of the internal combustion engine to circulate the lubricating medium. The circulation of the lubricating medium enables an efficient and even temperature rise of the lubricating medium.

The present invention is directed to a control method of a driving device equipped with a motor that is capable of inputting and outputting power, a gear change transmission assembly that has a power transmission mechanism and converts the output power of the motor by gear change and transmits the converted power to a driveshaft, and a lubrication structure that stores and uses a lubricating medium to lubricate at least the power transmission mechanism of the gear change transmission assembly and is arranged to enable heat exchange between at least part of the lubricating medium with the motor. Upon a certain request, the control method drives and controls the motor to enhance the heat exchange between the lubricating medium and the motor and thereby accelerate a temperature rise of the lubricating medium.

The control method of the driving device of the invention drives and controls the motor upon a certain request to enhance the heat exchange between the lubricating medium and the motor and thereby accelerate the temperature rise of the lubricating medium. The 'certain request' may be the operator's specific operation for setting a maintenance mode. Such drive control of the motor may be performed in the process of injecting a certain amount of a lubricating medium into the driving device for the purpose of maintenance of the driving device. This arrangement of the control method of the driving device enhances the heat exchange with the motor, which is driven to generate heat, and thereby ensures a quick temperature rise of the lubricating medium.

The present invention is directed to a control method of a motor vehicle equipped with an internal combustion engine, a motor that is capable of inputting and outputting power, a gear change transmission assembly that has a power transmission mechanism and converts the output power of the motor by gear change and transmits the converted power to an axle, and a lubrication structure that stores and uses a lubricating medium to lubricate at least the power transmission mechanism of the gear change transmission assembly, is arranged to enable heat exchange between at least part of the lubricating medium with the motor, and receives output power of the internal combustion engine to circulate the lubricating medium. Upon a certain request, the control method of the motor vehicle drives and controls the motor to enhance the heat exchange between the lubricating medium and the motor and thereby accelerate a temperature rise of the lubricating medium, while starting the internal combustion engine to circulate the lubricating medium.

Upon a certain request, the control method of the motor vehicle of the invention drives and controls the motor to enhance the heat exchange between the lubricating medium and the motor and thereby accelerate the temperature rise of the lubricating medium, while starting the internal combustion engine as the power source to circulate the lubricating medium. The 'certain request' may be the operator's specific operation for setting a maintenance mode. Such drive control of the motor may be performed in the process of injecting a certain amount of a lubricating medium into the driving device for the purpose of maintenance of the driving device. This arrangement of the control method of the motor vehicle enhances the heat exchange with the motor, which is driven to generate heat, and thereby ensures a quick temperature rise of the lubricating medium, while utilizing the output power of the internal combustion engine to circulate the lubricating medium. The circulation of the lubricating medium enables an efficient and even temperature rise of the lubricating medium.

BEST MODES OF CARRYING OUT THE INVENTION

Figure 1:
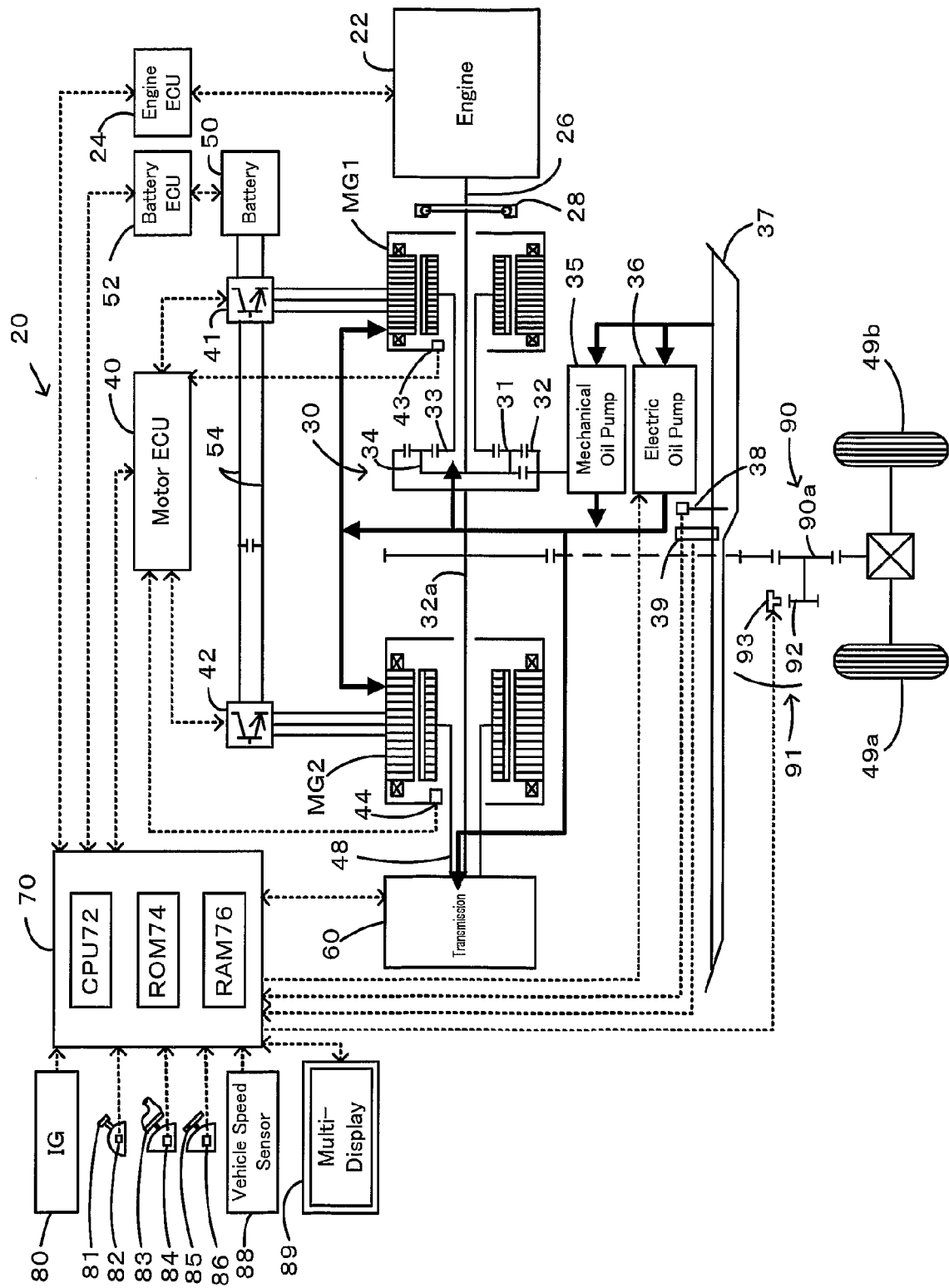
FIG. 1 schematically illustrates the configuration of a hybrid vehicle equipped with a driving device in one embodiment of the invention.

One mode of carrying out the invention is described below as a preferred embodiment with reference to the accompanied drawings. FIG. 1 schematically illustrates the configuration of a hybrid vehicle 20 equipped with a driving device in one embodiment of the invention. As illustrated, the hybrid vehicle 20 of the embodiment includes an engine 22 that consumes a fuel, such as gasoline, to output power, an engine electronic control unit 24 (hereafter referred to as engine ECU 24) that operates and controls the engine 22, a three shaft-type power distribution integration mechanism 30 that is linked to a crankshaft 26 or an output shaft of the engine 22 via a damper 28, a motor MG1 that is linked to the power distribution integration mechanism 30 and has power generation capability, a motor MG2 that is linked to the power distribution integration mechanism 30 via a transmission 60, a mechanical oil pump 35 and an electric oil pump 36 that feed supplies of lubricating oil for lubricating and cooling down the mechanical parts of the power distribution integration mechanism 30, the motors MG1 and MG2, and the transmission 60, an electronic control unit 70 that controls the operations of the whole hybrid vehicle 20, and a multi-display 89 that displays various pieces of information related to the hybrid vehicle 20 and allows and receives the operator's various entries. The thick arrows in FIG. 1 show the flows of lubricating oil supplied by the mechanical oil pump 35 and the electric oil pump 36. The driving device of this embodiment mainly consists of the power distribution integration mechanism 30, the motors MG1 and MG2, the transmission 60, the mechanical oil pump 35, the electric oil pump 36, the electronic control unit 70, and the multi-display 89.

The power distribution integration mechanism 30 includes a sun gear 31 as an external gear, a ring gear 32 as an internal gear arranged concentrically with the sun gear 31, multiple pinion gears 33 engaging with the sun gear 31 and with the ring gear 32, and a carrier 34 holding the multiple pinion gears 33 to allow both their revolutions and their rotations on their axes. The power distribution integration mechanism 30 is thus constructed as a planetary gear mechanism including the sun gear 31, the ring gear 32, and the carrier 34 as rotational elements of differential motions. The carrier 34, the sun gear 31, and the ring gear 32 of the power distribution integration mechanism 30 are respectively linked to the crankshaft 26 of the engine 22, to the motor MG1, and to the transmission 60 via a ring gear shaft 32a or a driveshaft. When the motor MG1 functions as a generator, the power of the engine 22 input via the carrier 34 is distributed into the sun gear 31 and the ring gear 32 corresponding to their gear ratio. When the motor MG1 functions as a motor, on the other hand, the power of the engine 22 input via the carrier 34 is integrated with the power of the motor MG1 input via the sun gear 31 and is output to the ring gear 32. The power output to the ring gear shaft 32a is eventually transmitted to drive wheels 49a and 49b of the hybrid vehicle 20 via a gear mechanism 90. The gear mechanism 90 is coupled with a parking lock mechanism 91. The parking lock mechanism 91 includes a parking gear 92 that is attached to a final gear 90a of the gear mechanism 90 and a parking lock pole 93 that engages with the parking gear 92 to lock and stop the rotation of the parking gear 92. The parking lock pole 93 moves up and down along its vertical axis by a command sent from a CPU 72, for example, in response to the driver's gearshift operation of a gearshift lever 81 to a parking (P) position. The vertical motions of the parking lock pole 93 engage and disengage the parking lock pole 93 with and from the parking gear 92 to enable and release the parking lock. The final gear 90a of the gear mechanism 90 is mechanically connected to the ring gear shaft 32a or the driveshaft. The parking lock mechanism 91 thus indirectly locks the ring gear shaft 32a or the driveshaft.

The mechanical oil pump 35 has a rotating shaft connected with the carrier 34 linked to the crankshaft 26. The mechanical oil pump 35 is driven by the rotation of the carrier 34 to supply the lubricating oil stored in an oil pan 37 to the power distribution integration mechanism 30 and the other relevant constituents. The electric oil pump 36 is driven with electric power supplied from an auxiliary machinery battery (not shown) to supply the lubricating oil stored in the oil pan 37 to the power distribution integration mechanism 30 and the other relevant constituents. The electric oil pump 36 is driven and controlled by the electronic control unit 70.

The motors MG1 and MG2 are constructed as known synchronous motor generators that may be actuated both as a generator and as a motor. The motors MG1 and MG2 transmit electric powers to and from a battery 50 via inverters 41 and 42. Power lines 54 connecting the battery 50 with the inverters 41 and 42 are structured as common positive bus and negative bus shared by the inverters 41 and 42. Such connection enables electric power generated by one of the motors MG1 and MG2 to be consumed by the other motor MG2 or MG1. Both the motors MG1 and MG2 are driven and controlled by a motor electronic control unit 40 (hereafter referred to as motor ECU 40). The motor ECU 40 inputs various signals required for driving and controlling the motors MG1 and MG2, for example, signals representing rotational positions of rotors in the motors MG1 and MG2 from rotational position detection sensors 43 and 44 and signals representing phase currents to be applied to the motors MG1 and MG2 from electric current sensors (not shown). The motor ECU 40 outputs switching control signals to the inverters 41 and 42. The motor ECU 40 establishes communication with the electronic control unit 70.

The battery 50 is under management and control of a battery electronic control unit 52 (hereafter referred to as battery ECU 52). The battery ECU 52 inputs various signals required for managing and controlling the battery 50 and establishes communication with the electronic control unit 70. The battery ECU 52 also computes a state of charge (SOC) of the battery 50 from an accumulated value of charge-discharge electric current measured by an electric current sensor (not shown) for the purpose of management and control of the battery 50.

Figure 2:
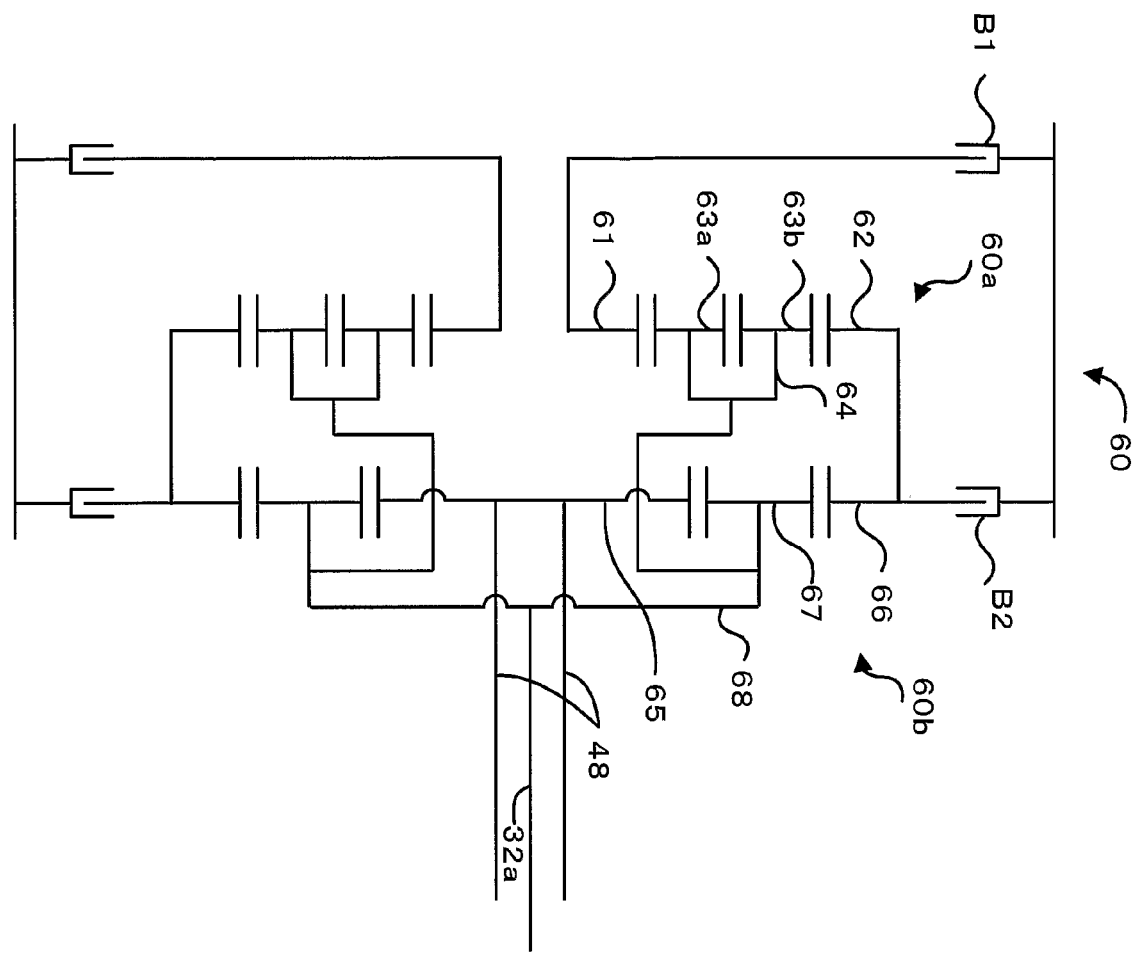
FIG. 2 shows the structure of a transmission mounted on the hybrid vehicle of the embodiment.

The transmission 60 is designed to connect and disconnect a hollow rotating shaft 48 of the motor MG2 with and from the ring gear shaft 32a. In the connection state, the transmission 60 reduces the rotation speed of the rotating shaft 48 of the motor MG2 at two different reduction gear ratios and transmits the reduced rotation speed to the ring gear shaft 32a. One typical structure of the transmission 60 is shown in FIG. 2. The transmission 60 shown in FIG. 2 has a double-pinion planetary gear mechanism 60a, a single-pinion planetary gear mechanism 60b, and two brakes B1 and B2 that apply friction-based coupling force. The double-pinion planetary gear mechanism 60a includes a sun gear 61 as an external gear, a ring gear 62 as an internal gear arranged concentrically with the sun gear 61, multiple first pinion gears 63a engaging with the sun gear 61, multiple second pinion gears 63b engaging with the multiple first pinion gears 63a and with the ring gear 62, and a carrier 64 coupling the multiple first pinion gears 63a to the multiple second pinion gears 63b to allow both their revolutions and their rotations on their axes. The engagement and the release of the brake B1 stop and allow the rotation of the sun gear 61. The single-pinion planetary gear mechanism 60b includes a sun gear 65 as an external gear, a ring gear 66 as an internal gear arranged concentrically with the sun gear 65, multiple pinion gears 67 engaging with the sun gear 65 and with the ring gear 66, and a carrier 68 holding the multiple pinion gears 67 to allow both their revolutions and their rotations on their axes. The sun gear 65 and the carrier 68 are respectively connected to the rotating shaft 48 of the motor MG2 and to the ring gear shaft 32a. The engagement and the release of the brake B2 stop and allow the rotation of the ring gear 66. The double-pinion planetary gear mechanism 60a and the single-pinion planetary gear mechanism 60b are coupled with each other via linkage of the respective ring gears 62 and 66 and linkage of the respective carriers 64 and 68. In the transmission 60, the combination of the released brakes B1 and B2 disconnects the rotating shaft 48 of the motor MG2 from the ring gear shaft 32a. The combination of the released brake B1 and the engaged brake B2 reduces the rotation of the rotating shaft 48 of the motor MG2 at a relatively high reduction gear ratio and transmits the reduced rotation to the ring gear shaft 32a. This state is expressed as Lo gear position. The combination of the engaged brake B1 and the released brake B2 reduces the rotation of the rotating shaft 48 of the motor MG2 at a relatively low reduction gear ratio and transmits the reduced rotation to the ring gear shaft 32a. This state is expressed as Hi gear position. The combination of the engaged brakes B1 and B2 prohibits the rotations of the rotating shaft 48 and the ring gear shaft 32a. The brakes B1 and B2 are actuated by a hydraulic circuit (not shown).

The electronic control unit 70 is constructed as a microprocessor including a CPU 72, a ROM 74 that stores processing programs, a RAM 76 that temporarily stores data, input and output ports (not shown), and a communication port (not shown). The electronic control unit 70 receives, via its input port, an oil temperature TO or temperature of the lubricating oil from a temperature sensor 38 attached to the oil pan 37, an oil level HO or level of the lubricating oil stored in the oil pan 37 from a level sensor 39, an ignition signal from an ignition switch 80, a gearshift position SP or a current setting position of the gearshift lever 81 from a gearshift position sensor 82, an accelerator opening Acc or the driver's depression amount of an accelerator pedal 83 from an accelerator pedal position sensor 84, a brake pedal position BP or the driver's depression amount of a brake pedal 85 from a brake pedal position sensor 86, a vehicle speed V from a vehicle speed sensor 88, and various operation signals from the multi-display 89. The electronic control unit 70 outputs, via its output port, driving signals to the electric oil pump 36, gear change signals to the transmission 60, and screen display signals to the multi-display 89. The electronic control unit 70 establishes communication with the engine ECU 24, the motor ECU 40, and the battery ECU 52 via its communication port as mentioned previously.

Figure 3:
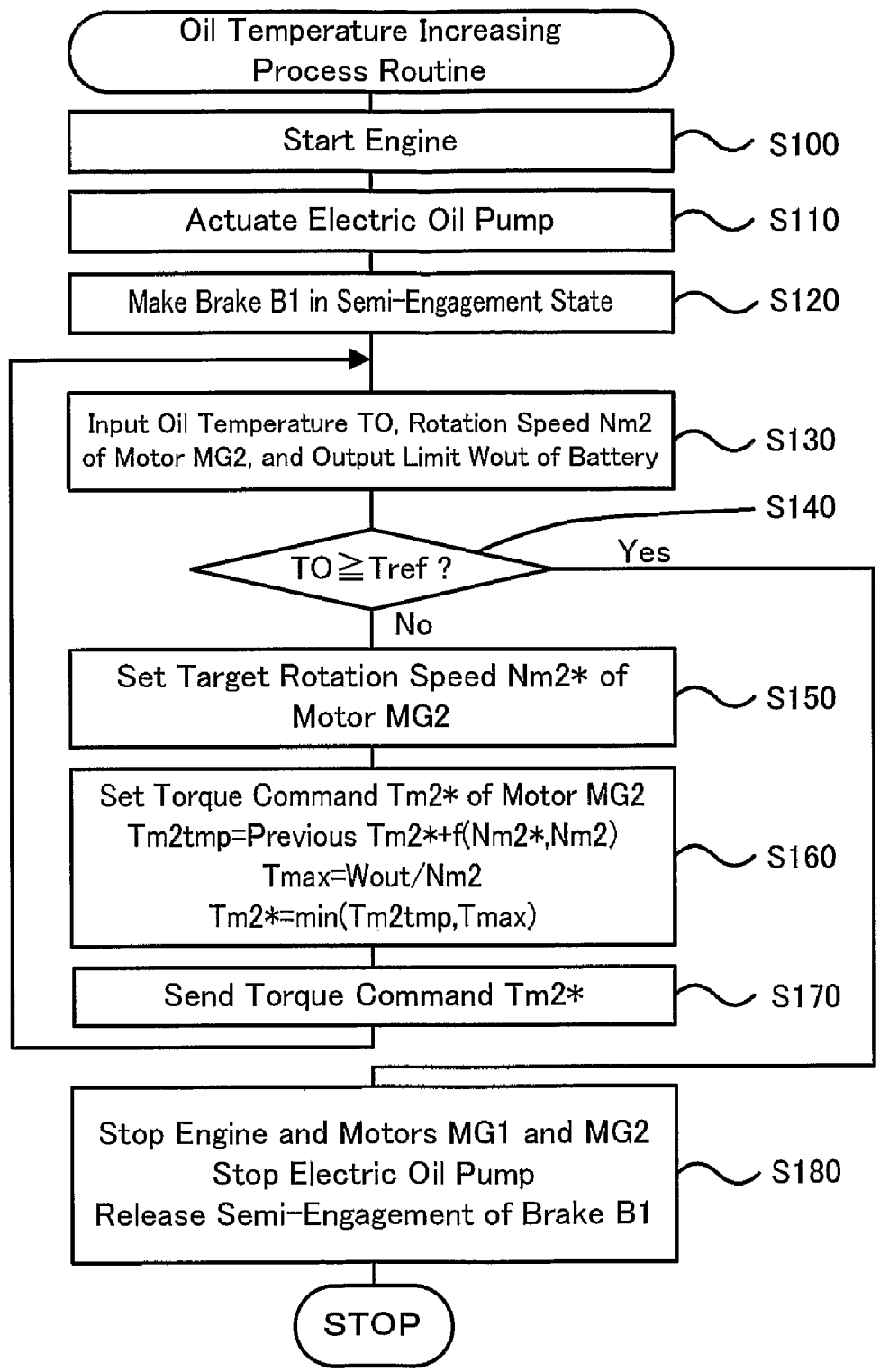
FIG. 3 is a flowchart showing an oil temperature increasing process routine executed by an electronic control unit mounted on the hybrid vehicle of the embodiment.

The description regards the operations of the hybrid vehicle 20 of the embodiment having the configuration discussed above, especially a series of control to raise the temperature of the lubricating oil to a preset temperature range in the process of injecting a certain amount of the lubricating oil into the hybrid vehicle 20 for the purpose of maintenance. The temperature of the lubricating oil affects the volume and the viscosity of the lubricating oil. The lubricating oil is thus heated to the preset temperature range. FIG. 3 is a flowchart showing an oil temperature increasing process routine executed by the electronic control unit 70. This routine is triggered by the operator's manipulation of the multi-display 89 to set an oil temperature increasing process mode. The hybrid vehicle 20 of this embodiment allows setting of the oil temperature increasing process mode only when the gearshift position SP is set in the parking (P) position, that is, only when the parking lock is enabled by the parking lock mechanism 91. Namely the hybrid vehicle 20 is kept in a stop during execution of this oil temperature increasing process routine.

In the oil temperature increasing process routine, the CPU 72 of the electronic control unit 70 first instructs the motor ECU 40 and the engine ECU 24 to start and operate the engine 22 at an actuation rotation speed Nd for actuation of the mechanical oil pump 35 (step S100) and actuates the electric oil pump 36 (step S110). The actuation rotation speed Nd represents a rotation speed required for actuation of the mechanical oil pump 35 and is set to or slightly over an idling rotation speed of the engine 22, for example, in a range of 600 rpm to 1000 rpm. The actuation of the mechanical oil pump 35 and the electric oil pump 36 circulates the flow of lubricating oil and enhances the heat exchange efficiency of the lubricating oil. The enhanced heat exchange efficiency of the lubricating oil quickly and evenly raises the temperature of the lubricating oil. The engine 22 is motored by the motor MG1 under drive control of the motor ECU 40. When rotation speed Ne of the engine 22 reaches a preset reference value Nref, for example, 800 rpm or 1000 rpm, the engine ECU 24 performs fuel injection control and ignition control to start the engine 22. The engine 22 is then subjected to air intake flow regulation, fuel injection control, and ignition control by the engine ECU 24 to be driven independently at the actuation rotation speed Nd. In the course of motoring the engine 22 by the motor MG1, a certain level of torque is output to the ring gear shaft 32*a* via the power distribution integration mechanism 30. The enabled parking lock by the parking lock mechanism 91, however, keeps the hybrid vehicle 20 in a stop, regardless of the torque output to the ring gear shaft 32*a*.

The CPU 72 then controls the hydraulic circuit to prevent fixation of the sun gear 61 to the casing by operation of the motor MG2 and to make the brake B1 in a semi-engagement state (step S120). The semi-engagement state of the brake B1 increases the output torque from the motor MG2 to accelerate heat generation by the motor MG2 and accelerates frictional heat generation by the brake B1.

The CPU 72 subsequently inputs various data required for control, that is, the oil temperature TO from the temperature sensor 38, a rotation speed Nm2 of the motor MG2, and an output limit Wout of the battery 50 (step S130) and determines whether the input oil temperature TO reaches or exceeds a preset reference temperature Tref (step S140). The rotation speed Nm2 of the motor MG2 is computed by the motor ECU 40 from the rotational position of the rotor in the motor MG2 detected by the rotational position detection sensor 44 and is received from the motor ECU 40 by communication. The output limit Wout of the battery 50 is set corresponding to the state of charge SOC of the battery 50 and other relevant data and is received from the battery ECU 52 by communication. The reference temperature Tref is used as a criterion of determining whether the temperature of the lubricating oil increases to a preset temperature range, for example, a temperature range of 40° C. to 50° C., and is set to a value exceeding a lower limit of the preset temperature range, for example, 43° C. or 45° C.

When the oil temperature TO is still lower than the preset reference temperature Tref (step S140: No), the CPU 72 sets a predetermined heat generation rotation speed Nh to a target rotation speed Nm2* of the motor MG2 (step S150), and sets a torque command Tm2* of the motor MG2 within the output limit Wout of the battery 50 to drive the motor MG2 at the set target rotation speed Nm2* (step S160). The oil temperature rising process routine sends the torque command Tm2* of the motor MG2 to the motor ECU 40 (step S170) and returns to step S130. The heat generation rotation speed Nh represents a rotation speed of interfering with the concentrated flow of electric current in only one phase of the motor MG2 and is set, for example, in a range of 500 rpm to 1500 rpm. A concrete procedure of setting the torque command Tm2* of the motor MG2 calculates a tentative motor torque Tm2*tmp* of the motor MG2 from the target rotation speed Nm2*, the current rotation speed Nm2, and a previous torque command Tm2* set in a previous cycle of this routine according to Equation (1) given below as a relational expression of feedback control:

$$Tm2tmp = \text{Previous } Tm2^* + k1(Nm2^* - Nm2) + k2\int (Nm2^* - Nm2)dt \quad (1)$$

The procedure then restricts the calculated motor torque Tm2tmp of the motor MG2 to a maximum torque restriction Tmax, which is obtained by dividing the output limit Wout of the battery 50 by the rotation speed Nm2 of the motor MG2, and accordingly sets the torque command Tm2* of the motor MG2. In Equation (1) given above, k1 and k2 denote constants. In response to reception of the torque command Tm2* of the motor MG2 sent from the electronic control unit 70, the motor ECU 40 increases the flow of electric current through a 'd' axis as an electric current component having no torque contribution in the known vector control and accordingly lowers the output efficiency of the motor MG2 relative to the applied electric current than the output efficiency in the standard driving control. The motor ECU 40 also performs switching control of switching elements included in the inverter 42 to ensure output of a torque equivalent to the set torque command Tm2* from the motor MG2. The increased electric current through the 'd' axis accelerates heat generation by the motor MG2 without causing output of an excessive torque from the motor MG2. The accelerated heat generation by the motor MG2 enables a quick temperature rise of the lubricating oil. The operation of the motor MG2 outputs the torque to the ring gear shaft 32*a*. The enabled parking lock by the parking lock mechanism 91, however, keeps the hybrid vehicle 20 in a stop, regardless of the torque output to the ring gear shaft 32*a*.

The oil temperature TO gradually increases to or over the preset reference temperature Tref during repeated execution of steps S130 to S170. When the oil temperature TO reaches or exceeds the preset reference temperature (step S140: Yes), it is determined that the temperature of the lubricating oil is increased to the preset temperature range. The CPU 72 accordingly instructs the engine ECU 24 and the motor ECU 40 to stop the operations of the engine 22 and the motors MG1 and MG2, stops actuation of the electric oil pump 36, and releases the semi-engagement of the brake B1 (step S180). The oil temperature rising process routine is then terminated.

As described above, the driving device mounted on the hybrid vehicle 20 of the embodiment utilizes the heat generated by the operation of the motor MG2 to quickly raise the temperature of the lubricating oil. The operation of the motor MG2 with the lowered output efficiency accelerates heat generation by the motor MG2 and thus ensures a quick temperature rise of the lubricating oil. The operation of the motor MG2 in the semi-engagement state of the brake B1 further accelerates heat generation by the motor MG2 and by the transmission 60 and enables a quicker temperature rise of the lubricating oil. The driving device of the embodiment starts the engine 22 for actuation of the mechanical oil pump 35 and actuates the electric oil pump 36 to circulate the flow of lubricating oil. This enhances the heat exchange efficiency of the lubricating oil and thus attains a quick and even temperature rise of the lubricating oil.

In the driving device mounted on the hybrid vehicle 20 of the embodiment, the drive control sets the heat generation rotation speed Nh, for example, in the range of 500 rpm to 1500 rpm, to the target rotation speed Nm2* of the motor MG2. Such setting is, however, not restrictive, but the target rotation speed Nm2* of the motor MG2 may be set to a rotation speed of lower than 500 rpm or to a rotation speed of higher than 1500 rpm.

The driving device mounted on the hybrid vehicle 20 of the embodiment increases the flow of electric current through the 'd' axis as the electric current component having no torque contribution in the vector control and accordingly lowers the output efficiency of the motor MG2 relative to the applied electric current than the output efficiency in the standard driving control. The degree of lowering the output efficiency is not restricted but may be determined arbitrarily. The electric current component may be regulated in the vector control to keep a relatively high output efficiency of the motor MG2, which is equivalent to the output efficiency in the standard driving control.

The driving device mounted on the hybrid vehicle 20 of the embodiment sets the torque command Tm2* of the motor MG2 within the output limit Wout of the battery 50. The torque command Tm2* of the motor MG2 may be restricted in advance to a limit value, which is lower than the output limit Wout of the battery 50. The drive control may not take into account the output limit Wout of the battery 50 when the rated value of the motor MG2 is lower than the output limit Wout of the battery 50.

The driving device mounted on the hybrid vehicle 20 of the embodiment drives the motor MG2 after setting the brake B1 in the semi-engagement state. One possible modification of the drive control may drive the motor MG2 after setting the brake B2 in the semi-engagement state. Another possible modification may drive the motor MG2 without application of any engagement force to either of the brakes B1 and B2.

The driving device mounted on the hybrid vehicle 20 of the embodiment actuates both the mechanical oil pump 35 and the electric oil pump 36 for circulation of the lubricating oil. This is, however, not essential, and only one of the mechanical oil pump 35 and the electric oil pump 36 may be actuated for circulation of the lubricating oil. The driving device may have only one of the mechanical oil pump 35 and the electric oil pump 36. The operation of the engine 22 is not required for circulation of the lubricating oil under the condition of no actuation of the mechanical oil pump 35 or in the structure without the mechanical oil pump 35.

Figure 4:
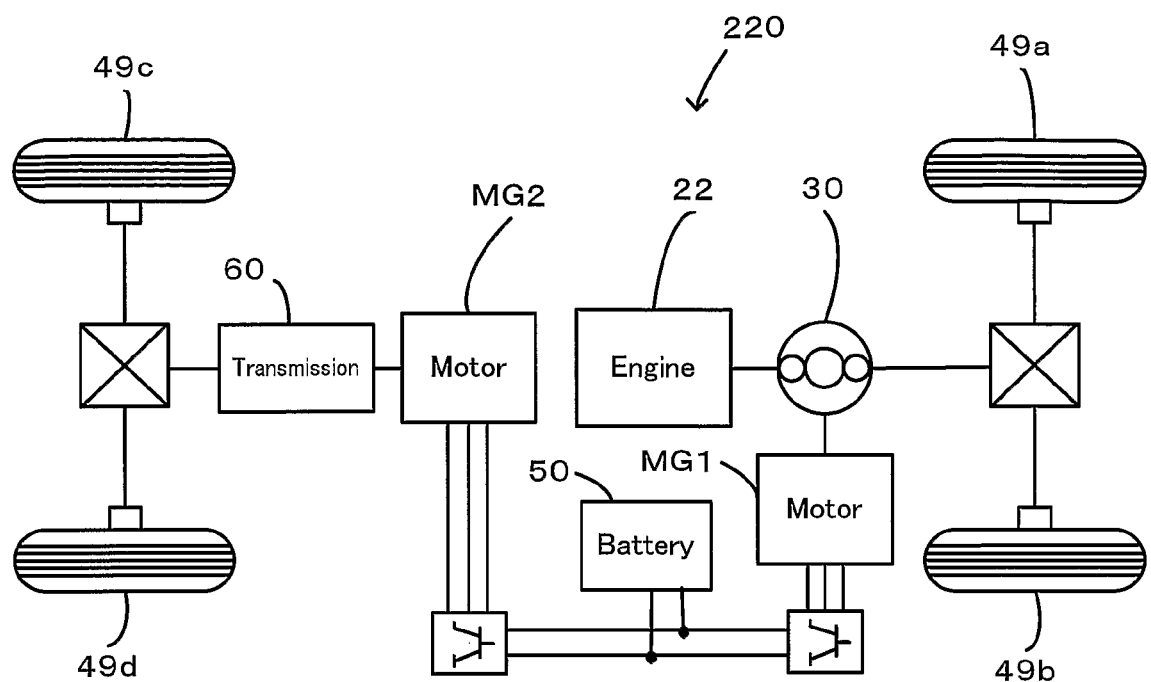
FIG. 4 schematically illustrates the configuration of another hybrid vehicle in one modified example.

In the hybrid vehicle 20 of the embodiment described above, the power of the motor MG2 is converted by the gear change in the transmission 60 and is output to the ring gear shaft 32a or the driveshaft. The technique of the invention is, however, not restricted to this configuration but may be adopted in a hybrid vehicle 220 of a modified configuration shown in FIG. 4, where the power of the motor MG2 is converted by the gear change in the transmission 60 and is transmitted to a different axle (an axle linked to wheels 49c and 49d) from the axle connecting with the ring gear shaft 32a (the axle linked to the drive wheels 49a and 49b).

Figure 5:
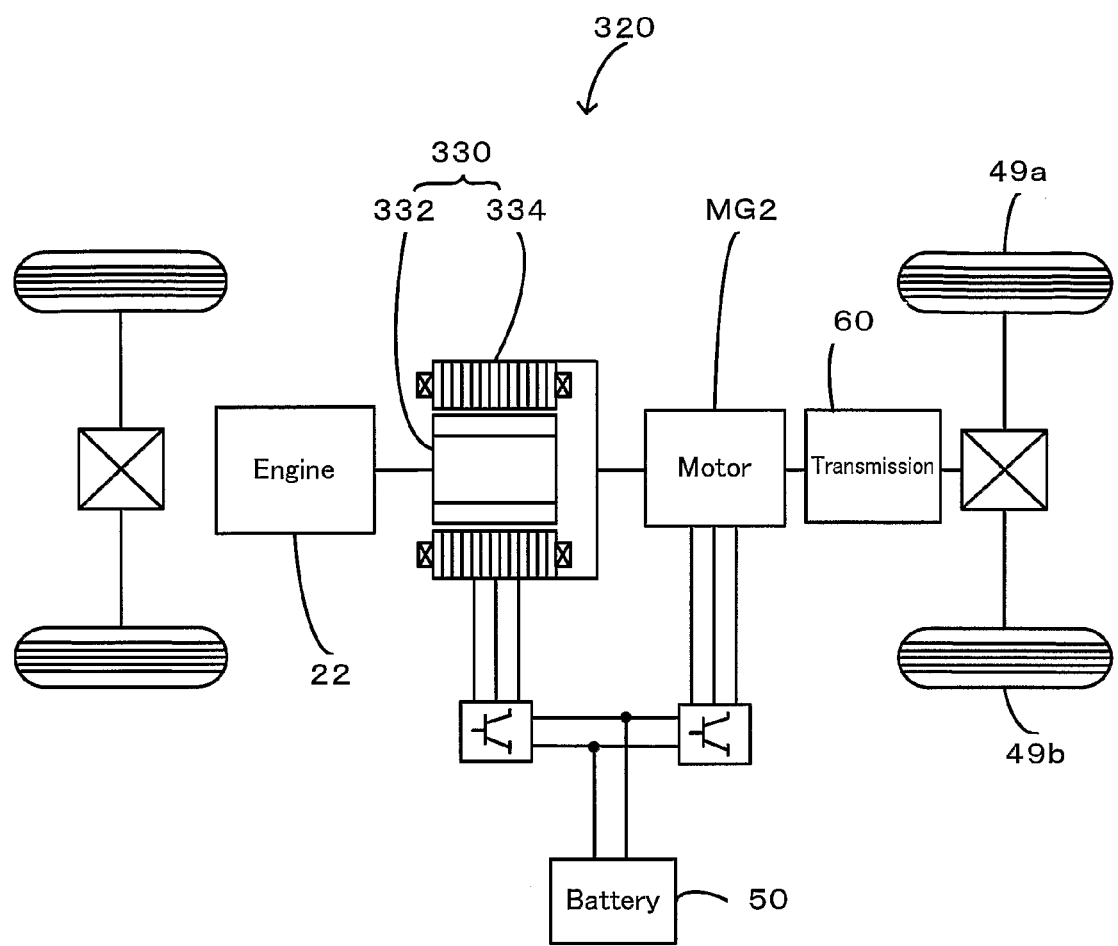
FIG. 5 schematically illustrates the configuration of still another hybrid vehicle in another modified example.

In the hybrid vehicle 20 of the embodiment, the power of the engine 22 is output via the power distribution integration mechanism 30 to the ring gear shaft 32a or the driveshaft connected to the drive wheels 49a and 49b. The technique of the invention is, however, not restricted to this configuration but may also be applicable to a hybrid vehicle 320 of another modified configuration shown in FIG. 5. The hybrid vehicle 320 of FIG. 5 has a pair-rotor motor 330 including an inner rotor 332 connected to the crankshaft 26 of the engine 22 and an outer rotor 334 connected to a driveshaft for output of the power to the drive wheels 49a and 49b. The pair-rotor motor 330 transmits part of the output power of the engine 22 to the driveshaft, while converting the residual engine output power into electric power.

Figure 6:
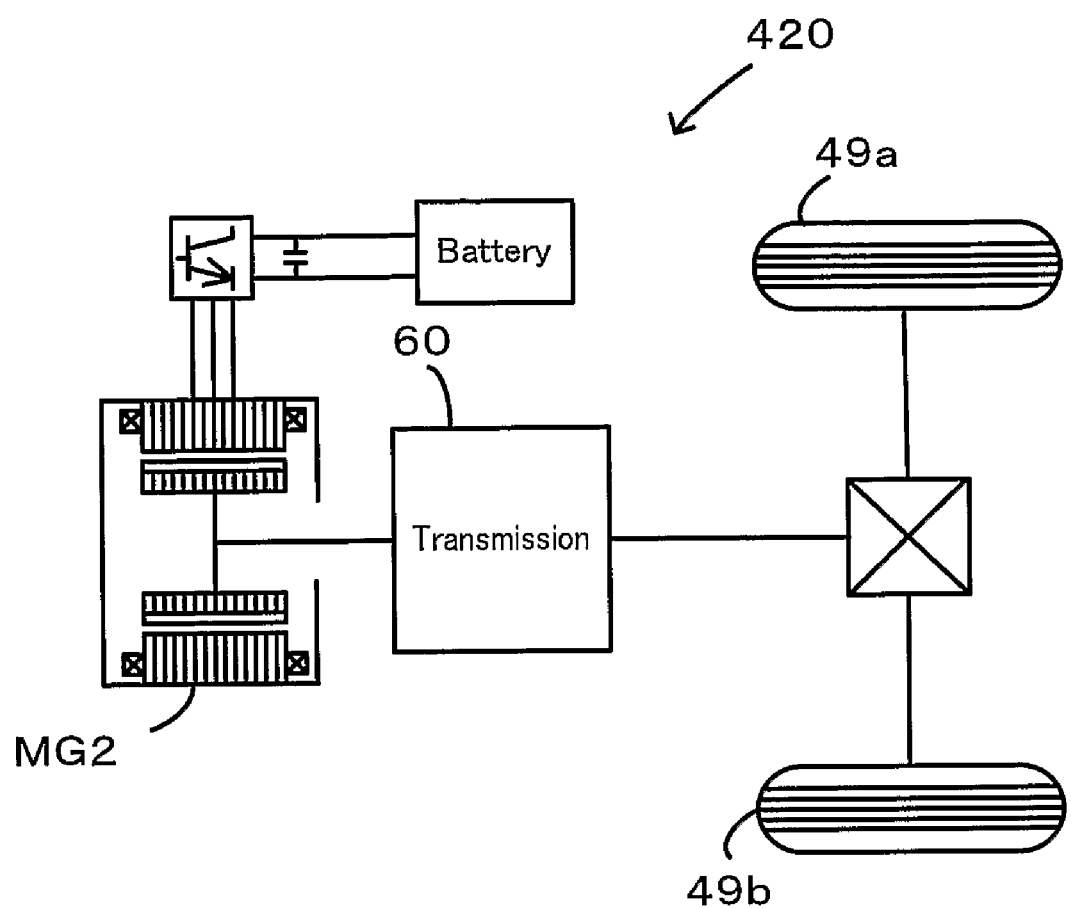
FIG. 6 schematically illustrates the configuration of an electric vehicle as another modification.

The hybrid vehicle 20 of the embodiment has the engine 22, the two motors MG1 and MG2, the power distribution integration mechanism 30, and the transmission 60. The technique of the invention is also applicable to the configuration of an electric vehicle 420 without an engine as shown in FIG. 6 as another possible modification.

The embodiment and its modifications discussed above are to be considered in all aspects as illustrative and not restrictive. There may be many other modifications, changes, and alterations without departing from the scope or spirit of the main characteristics of the present invention. All changes within the meaning and range of equivalency of the claims are intended to be embraced therein. The scope and spirit of the present invention are indicated by the appended claims, rather than by the foregoing description.

INDUSTRIAL APPLICABILITY

The technique of the invention is preferably applied to the manufacturing industries of driving devices and motor vehicles, the maintenance and service industries of driving devices and motor vehicle, and other relevant industries.

The invention claimed is:

1. A driving device that is equipped with a motor having power input and output capabilities, said driving device comprising:
a gear change transmission assembly that has a power transmission mechanism and converts the output power of the motor by gear change and transmits the converted power to a driveshaft;
a lubrication structure that stores and uses a lubricating medium to lubricate at least the power transmission mechanism of the gear change transmission assembly and is arranged to enable heat exchange between at least part of the lubricating medium with the motor;
an upon-request control module that drives and controls the motor upon a certain request to enhance the heat exchange between the lubricating medium and the motor and thereby accelerate a temperature rise of the lubricating medium; and
a locking mechanism that locks the driveshaft in a non-rotatable state,
wherein said upon-request control module controls the motor and the locking mechanism to heat up the lubricating medium through the heat exchange with the locked driveshaft in the non-rotatable state.

2. A driving device in accordance with claim 1, said driving device further comprising:
an accumulator unit that transmits electric power to and from the motor,
wherein said upon-request control module drives and controls the motor within an output limit of the accumulator unit.

3. A driving device in accordance with claim 1, wherein said upon-request control module drives and controls the motor to accelerate heat generation by the motor.

4. A driving device in accordance with claim 1, wherein the gear change transmission assembly has a movable section that moves with rotation of the motor and an engagement section that applies a friction-based engagement force to the movable section,
wherein said upon-request control module controls the motor and the gear change transmission assembly to drive the motor and make the engagement section of the gear change transmission assembly in a semi-engagement state.

5. A driving device that is used in combination with an internal combustion engine and is equipped with a motor having power input and output capabilities, said driving device comprising:
a gear change transmission assembly that has a power transmission mechanism and converts the output power of the motor by gear change and transmits the converted power to a driveshaft;
a lubrication structure that stores and uses a lubricating medium to lubricate at least the power transmission mechanism of the gear change transmission assembly, is arranged to enable heat exchange between at least part of the lubricating medium with the motor, and receives output power of the internal combustion engine to circulate the lubricating medium;
an upon-request control module that, upon a certain request, drives and controls the motor to enhance the heat exchange between the lubricating medium and the motor and thereby accelerate a temperature rise of the lubricating medium, while starting the internal combustion engine to circulate the lubricating medium; and
a locking mechanism that locks the driveshaft in a non-rotatable state,
wherein said upon-request control module controls the motor and the locking mechanism to heat up the lubricating medium through the heat exchange with the locked driveshaft in the non-rotatable state.

6. A driving device in accordance with claim 5, wherein the gear change transmission assembly has a movable section that moves with rotation of the motor and an engagement section that applies a friction-based engagement force to the movable section,
wherein said upon-request control module controls the motor and the gear change transmission assembly to drive the motor and make the engagement section of the gear change transmission assembly in a semi-engagement state.

7. A driving device in accordance with claim 5, said driving device further comprising:
an electric power-mechanical power input output mechanism that is connected to an output shaft of the internal combustion engine and to the driveshaft and outputs at least part of the output power of the internal combustion engine to the driveshaft through input and output of electric power and mechanical power; and
an accumulator unit that transmits electric power to and from the electric power-mechanical power input output mechanism and the motor,
wherein said upon-request control module drives the electric power-mechanical power input output mechanism and the motor within an output limit of the accumulator unit.

8. A motor vehicle, comprising:
a motor that is capable of inputting and outputting power;
a gear change transmission assembly that has a power transmission mechanism and converts the output power of the motor by gear change and transmits the converted power to an axle;
a lubrication structure that stores and uses a lubricating medium to lubricate at least the power transmission mechanism of the gear change transmission assembly and is arranged to enable heat exchange between at least part of the lubricating medium with the motor;
an upon-request control module that drives and controls the motor upon a certain request to enhance the heat exchange between the lubricating medium and the motor and thereby accelerate a temperature rise of the lubricating medium; and
a locking mechanism that locks the axle in a non-rotatable state, wherein said upon-request control module controls the motor and the locking mechanism to heat up the lubricating medium through the heat exchange with the locked axle in the non-rotatable state.

9. A control method of a driving device equipped with a motor that is capable of inputting and outputting power, a gear change transmission assembly that has a power transmission mechanism and converts the output power of the motor by gear change and transmits the converted power to a driveshaft, a lubrication structure that stores and uses a lubricating medium to lubricate at least the power transmission mechanism of the gear change transmission assembly and is arranged to enable heat exchange between at least part of the lubricating medium with the motor, and a locking mechanism that locks the driveshaft in a non-rotatable state;
upon a certain request, said control method drives and controls the motor to enhance the heat exchange between the lubricating medium and the motor and thereby accelerate a temperature rise of the lubricating medium,
wherein the control method controls the motor and the locking mechanism to heat up the lubricating medium through the heat exchange with the locked driveshaft in the non-rotatable state.

10. A control method of a motor vehicle equipped with an internal combustion engine, a motor that is capable of inputting and outputting power, a gear change transmission assembly that has a power transmission mechanism and converts the output power of the motor by gear change and transmits the converted power to an axle, a lubrication structure that stores and uses a lubricating medium to lubricate at least the power transmission mechanism of the gear change transmission assembly, is arranged to enable heat exchange between at least part of the lubricating medium with the motor, and receives output power of the internal combustion engine to circulate the lubricating medium, and a locking mechanism that locks the axle in a non-rotatable state,
upon a certain request, said control method drives and controls the motor to enhance the heat exchange between the lubricating medium and the motor and thereby accelerate a temperature rise of the lubricating medium, while starting the internal combustion engine to circulate the lubricating medium, wherein the control method controls the motor and the locking mechanism to heat up the lubricating medium through the heat exchange with the locked axle in the non-rotatable state.

11. A motor vehicle, comprising:
an internal combustion engine;
a motor that is capable of inputting and outputting power;
a gear change transmission assembly that has a power transmission mechanism and converts the output power of the motor by gear change and transmits the converted power to a driveshaft;
a lubrication structure that stores and uses a lubricating medium to lubricate at least the power transmission mechanism of the gear change transmission assembly, is arranged to enable heat exchange between at least part of the lubricating medium with the motor, and receives output power of the internal combustion engine to circulate the lubricating medium;
an upon-request control module that, upon a certain request, drives and controls the motor to enhance the heat exchange between the lubricating medium and the motor and thereby accelerate a temperature rise of the lubricating medium, while starting the internal combustion engine to circulate the lubricating medium; and
a locking mechanism that locks the driveshaft in a non-rotatable state,
wherein said upon-request control module controls the motor and the locking mechanism to heat up the lubricating medium through the heat exchange with the locked driveshaft in the non-rotatable state.

* * * * *